United States Patent

Liu

[11] Patent Number: 5,566,233
[45] Date of Patent: Oct. 15, 1996

[54] COMMUNICATION CONTROLLING APPARATUS FOR A SINGLE-LINE TELEPHONE WITH EXTENSIONS THERETO

[76] Inventor: Kung-hsung Liu, 4th Fl., No. 111, Sec. 3, Chengteh Rd., Taipei, Taiwan

[21] Appl. No.: 426,021

[22] Filed: Apr. 21, 1995

[51] Int. Cl.⁶ .............................. H04M 1/60; H04M 9/00; H04M 13/00
[52] U.S. Cl. .................... 379/167; 379/168; 379/169; 379/170; 379/171; 379/177; 379/181; 379/184
[58] Field of Search ...................... 379/156, 157, 379/159, 164, 165, 166, 167, 171, 177, 181, 184, 168, 169, 170

[56] References Cited

U.S. PATENT DOCUMENTS

| | | | |
|---|---|---|---|
| 4,809,317 | 2/1989 | Howe | 379/184 |
| 4,821,319 | 4/1989 | Middleton | 379/167 |
| 5,179,588 | 1/1993 | Nowicki | 379/171 |
| 5,208,851 | 5/1993 | Blanchette | 379/177 |
| 5,454,032 | 9/1995 | Pinard | 379/167 |

Primary Examiner—Wellington Chin
Assistant Examiner—Vijay Shankar
Attorney, Agent, or Firm—Webb Ziesenheim Bruening Logsdon Orkin & Hanson, P.C.

[57] ABSTRACT

In a single-line telephone, there are a plurality of extension telephone sets connected by a telephone line and each extension telephone set is connected to a communication controlling apparatus. The communication controlling apparatus includes an alternating current coupler and a power supply thus allowing two extension telephone sets to communicate with each other without being disturbed by a busy tone.

4 Claims, 3 Drawing Sheets

COMMUNICATION CONTROLLING APPARATUS FOR A SINGLE-LINE TELEPHONE WITH EXTENSIONS THERETO

BACKGROUND OF THE INVENTION

The present invention relates to a communication controlling apparatus for a single-line telephone with extensions thereto, especially one which allows an external call to be received when two extension telephone sets are in communication.

Telephone communication is used popularly in nearly every family at the present time. Most families have installed extension telephone sets in different rooms. However, persons in different rooms can not have a convenient communication using the extension telephone sets, because a busy tone will be heard in each extension telephone set when the persons communicate with each other. Moreover, an external call can not come in when the persons are using the very inconvenient extension telephone sets to have an intercom telephone communication. Therefore, it is requisite to provide a communication controlling apparatus which allows people in different rooms of a house to use extension telephone sets to communicate with each other and also allows an external call to come in.

SUMMARY OF THE INVENTION

The primary objective of the present invention is to provide a communication controlling apparatus for a single-line telephone with extensions thereto, thus allowing two extension telephone sets to communicate with each other without being disturbed by a busy tone from a telephone exchange and also allowing an external call to come in when the two extension telephone sets are being used for intercom telephone communication.

In accordance with one aspect of the invention, there is provided a communication controlling apparatus for a single-line telephone with extension telephone sets connected thereto, where the extension telephone sets are electrically connected by a telephone line and the communication controlling apparatus is connected to a corresponding extension telephone set, the communication controlling apparatus comprising:

a preprogrammed microprocessor;

a relay driving means being connected to the microprocessor and the extension telephone set; and connecting the telephone line with the extension telephone set;

an alternating current coupler being connected between the relay driving means and the telephone line for isolating a busy tone from the telephone line thus allowing a user of the extension telephone set to have an intercom telephone communication with another extension telephone set without being disturbed by the busy tone;

an on-line detecting means being electrically connected between the microprocessor and the extension telephone set for detecting a status of the extension telephone set which is either picked up or hung up and sending a status indicative signal to inform the microprocessor of the status of the extension telephone set;

a pulse detecting means for detecting a call-in signal from any one of other extension telephone sets via the telephone line and sending a detecting signal to the microprocessor in response;

an on-line holding means for holding an external call-in signal on the telephone line;

a pulse outputting circuit being connected to and driven by the microprocessor to send a call-out signal to another extension telephone set via the telephone line;

a power supply which is connected to and activated by the microprocessor for providing required working power to the relay driving circuit;

a setting switch being connected to the microprocessor for setting a number corresponding to this extension telephone set;

a key array being connected to the microprocessor for inputting either a transferring command or a dialing number of a destination extensions telephone set to the microprocessor to command the microprocessor to execute a corresponding action;

whereby the extension telephone set is electrically-connected to the telephone line via the relay driving means but not via the alternating current coupler when the extension telephone set is not picked up, but when the extension telephone set is picked up, the extension telephone set is electrically connected to the telephone line via the alternating current coupler and the relay driving means.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

The present invention relates to a communication controlling apparatus for a single-line telephone with extensions thereto. The communication controlling apparatus of the present invention is installed in each extension telephone set of a single-line telephone in a home or a building such that two extension telephone sets can have a telephone intercom communication with each other and also allow an external call to be received when the two extension telephone sets are in communication.

Figure 1:
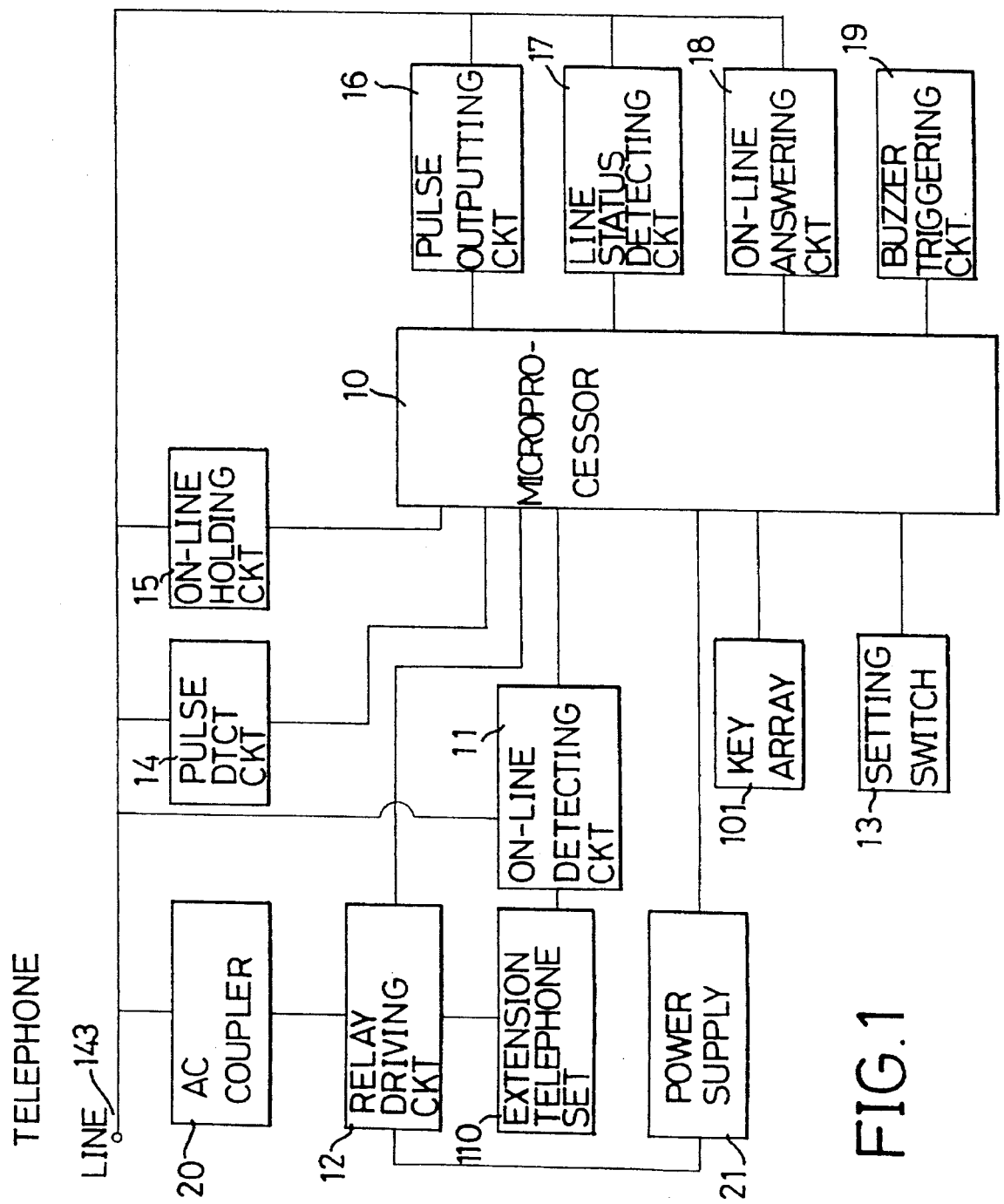
FIG. 1 is block diagram of a communication controlling apparatus in accordance with the present invention.

Referring to FIG. 1, the communication controlling apparatus comprises a microprocessor 10 connected to an on-line detecting circuit 11, a relay driving circuit 12, a pulse detecting circuit 14, an on-line holding circuit 15, a pulse outputting circuit 16, a line status detecting circuit 17, an on-line answering circuit 18, a buzzer triggering circuit 19, a key array 101, and a setting switch 13.

The on-line detecting circuit 11 is electrically connected between the microprocessor 10 and an extension telephone set 110 for detecting whether the extension telephone set 110 is picked up and sending a status indicative signal to inform the microprocessor 10 of the status of the extension telephone set 110. That is, the microprocessor 10 can determine whether the extension telephone set 110 is either in a picked-up (on-line) status or in a hung-up status.

The relay driving circuit 12 is electrically connected to the telephone line 143 via an alternating current coupler 20. The relay driving circuit 12 is also electrically connected to the microprocessor 10 and the extension telephone set 110. A power supply 21 which is activated by the microprocessor 10 is used for providing required working power to the relay driving circuit 12.

The pulse detecting circuit 14, the on-line holding circuit 15, the pulse outputting circuit 16, the line status detecting circuit 17, and the on-line answering circuit 18 are electrically connected to the telephone line 143.

The pulse detecting circuit 14 detects a call-in signal which is sent from any one of other extension telephone sets 110 via the telephone line 143 and sends a detecting signal to the microprocessor 10. The on-line holding circuit 15 is controlled by the microprocessor 10 to hold an external call-in signal on the telephone line 143. The pulse outputting circuit 16 is driven by the microprocessor 10 to send a call-out signal to another extension telephone set 110 via the telephone line 143. The line status detecting circuit 17 is used to detect whether or not a destination extension telephone set 110 is being picked up when an external call-in signal is transferred from this extension telephone set 110 to that destination extension telephone set 110, and to release the on-line holding circuit 15 when the destination extension telephone set 100 is picked up. The on-line answering circuit 18 is driven by the microprocessor 10 to send out an answering ring via the telephone line 143 to inform the received party that this extension telephone set 110 is still on line when the external telephone call is being held.

The buzzer triggering circuit 19 is driven by the microprocessor 10 to inform the user of this extension telephone set 110 of a call from another extension telephone set 110. The key array 101 is connected to the microprocessor 10 for inputting either a transferring command or a dialing number of a destination extension telephone set 110 to the microprocessor 10 to command the latter to execute a corresponding action. The setting switch 13 is used to set a number corresponding to this extension telephone set 110.

The alternating current coupler 20 is used to isolate a dialing tone and a busy tone from the telephone line 143 thus allowing two extension telephone sets 110 to have an intercom telephone communication with each other without being disturbed by the busy tone. The alternating current coupler 20 permits an external ringing tone to pass therethrough thus allowing two users in intercom telephone communication by the extension telephone sets 110 to notice the existence of an external telephone call, therefore when the two users hang up their telephone sets, either of the two users can pick his telephone set again and communicate with a calling party who is making the external telephone call.

The operation of the communication controlling apparatus of the present invention is described in more detail hereinafter. When the communication controlling apparatus for extension telephone sets is installed in each extension telephone set 110 of a single-line telephone, an extension number is assigned to a corresponding extension telephone set 110 by operating the setting switch 13. When a first user wants to call a second user in the single-line telephone, the first user can dial an extension number from a key array 101 installed in an extension telephone set 110 to ring a corresponding extension telephone set 110 which is nearby the second user.

A calling party dials a destination extension number on the key array 101, and the microprocessor 10 drives the pulse outputting circuit 16 to output a calling signal to the telephone line 143 in response. When the calling signal is sent to the telephone line 143, other extension telephone sets 110 which are connected to the telephone line 143 will receive the calling signal, but only the destination one will be responsive to the call. The communication controlling apparatus installed in the destination extension telephone set 110 will receive the calling signal from the pulse detecting circuit 14 and pass the calling signal to the microprocessor 10, which in turn identifies the calling number. If the calling number matches with the number already set in the microprocessor 10, the microprocessor 10 will drive the buzzer triggering circuit 19 to emit buzzing sounds to inform the user of the destination extension telephone set 110. When the user of the destination extension telephone set 110 picks up the telephone set, the on-line detecting circuit 11 will detect the fact that the two extension telephone sets 110 are in communication and inform the microprocessor 10 of this fact. The microprocessor 10 simultaneously activates the relay driving circuit 12 and the power supply 21, thus causing the relay driving circuit 12 to electrically connect the destination extension telephone set 110 to the power supply 21 and also causing the relay driving circuit 12 to electrically connect the destination extension telephone set 110 to the telephone line 143. In the mean time, the destination extension telephone set 110 is activated by a power provided by the power supply 21, and a communication signal sent from the destination extension telephone set 110 is fed to the telephone line 143 via the relay driving circuit 12 and the alternating current coupler 20 and is further fed to the extension telephone set 110 of the calling party via the alternating current coupler 20 and the relay driving circuit 12 thereof. It is noted that when the extension telephone set 110 of the calling party is picked up, the relay driving circuit 12 and the power supply 21 on the calling party side are activated and function similarly to those in the receiving party side, therefore the detailed operation thereof is not repeated herein. Since both the two extension telephone sets 110 in either of the calling side or the receiving side use the power from its corresponding power supply 21 and a direct current from the telephone exchange is isolated by the corresponding alternating current coupler 20 in each party (the calling party and the receiving party), the two extension telephone sets 110 do not consume the direct current from the telephone exchange. Since the two extension telephone sets 110 do not use the direct current from the telephone exchange, the telephone exchange will not send out a busy tone or a dialing tone to disturb the inner communication between the two extension telephone sets 110.

From above, it is known that two users of a single-line telephone are allowed to communicate with each other by utilizing this communication controlling apparatus. When two extension telephone sets 110 are in communication with each other, an external telephone call still can be received. Specifically, when two users are having an intercom telephone communication, a ringing signal of an external call can be received through the alternating current coupler 20 and the relay driving circuit 12 and reach the extension telephone set 110 thus the two parties in intercom telephone communication can hear a ringing tone from their respective extension telephone sets 110. In the mean time, if the two parties hang up their extension telephone sets 110 and one of them picks up his telephone set again, he will receive the external telephone call. If the user needs to transfer the external telephone to a designated person other than himself, he may depress a transferring key (not shown) on the key array 101 thus causing the microprocessor 10 to command the on-line holding circuit 15 to hold the external telephone on the telephone line 143 and command the on-line answering circuit 18 to output an answering sound to inform the external calling party that his telephone is still on line, and then he may dial a destination extension number to the designated person. When the designated person picks up his telephone set, a voltage level (direct current) on the telephone line 143 will be reduced to a lower level. This voltage-reduced phenomenum is detected by the line status detecting circuit 17 in the transferring side and the microprocessor 10 thereof will respond to command the on-line holding circuit 15 to release the holding status of the external telephone. In the mean time, if the person in the transferring side hangs up his extension telephone set, the external telephone will be received by the designated person thus finishing the transfer.

Figure 2:
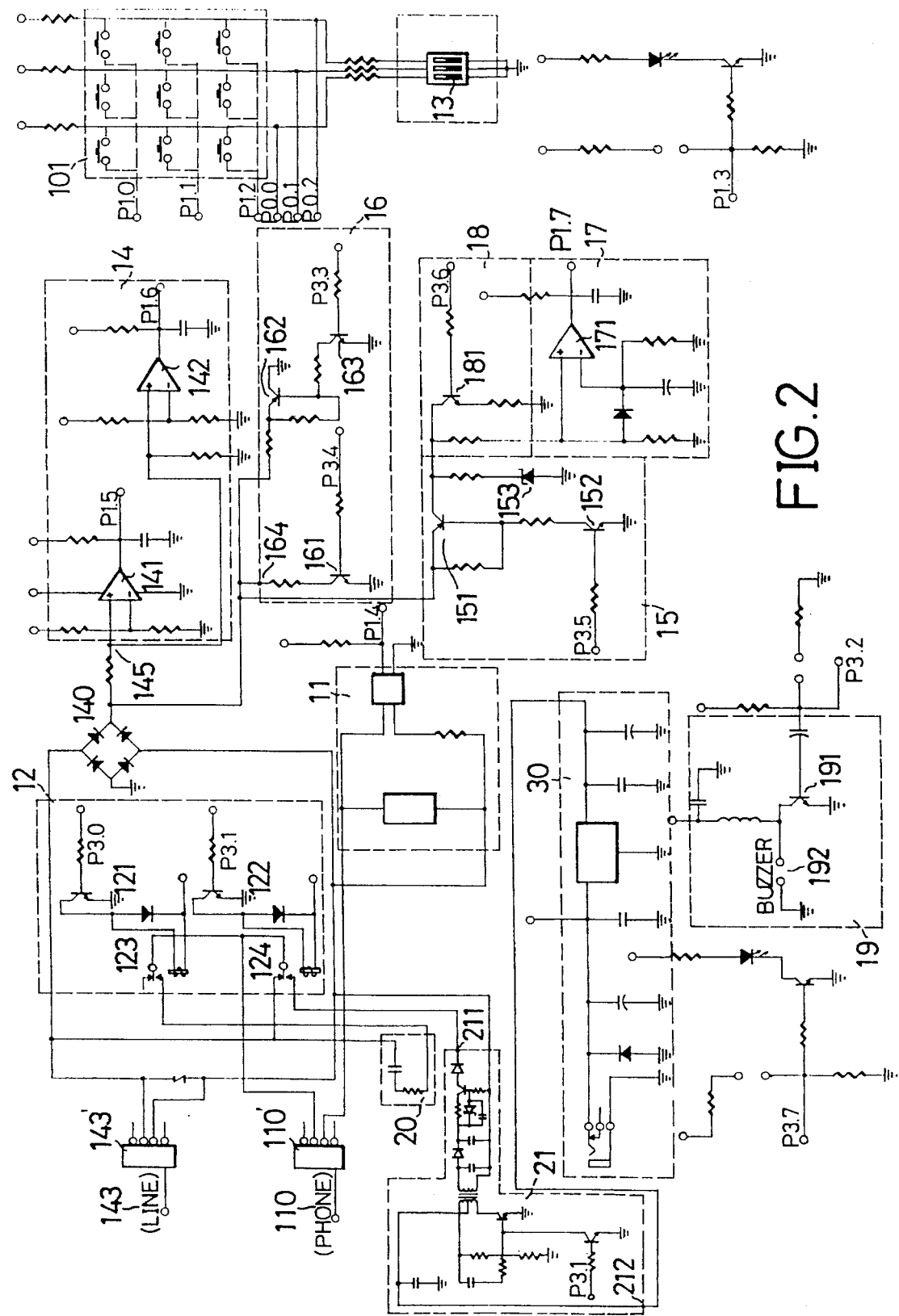
FIGS. 2 and 3 together illustrate a detailed circuit of FIG. 1.
Figure 3:
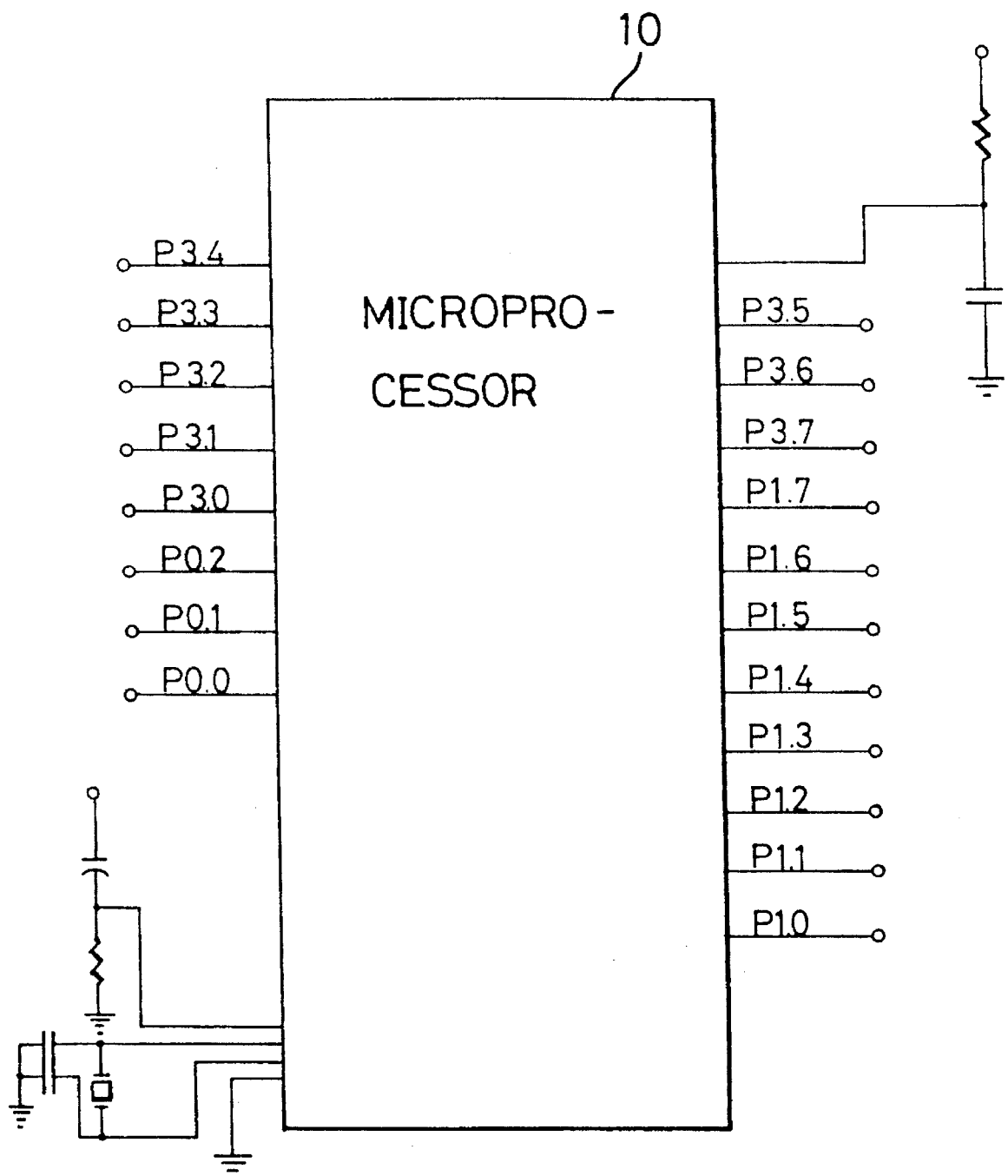

A more detailed circuit of FIG. 1 is illustrated in FIGS. 2 and 3. Referring to FIGS. 2 and 3, the microprocessor 10 includes an input pin P1.4 connected to the on-line detecting circuit 11, two output pins P3.0 and P3.1 connected to the relay driving circuit 12, two input pins P1.5 and P1.6 connected to the pulse detecting circuit 14, one output pin P3.5 connected to the on-line holding circuit 15, two output pins P3.3 and P3.4 connected to the pulse outputting circuit 16, one input pin P1.7 connected to the line status detecting circuit 17, one output pin P3.2 connected to the on-line answering circuit 18, one output pin P3.2 connected to the buzzer triggering circuit 19, six input pins P0.0, P0.1, P0.2, P1.0, PI.1, and P1.2 connected to the key array 101, the input pins P0.0, P0.1, P0.2 being connected to the setting switch 13.

The on-line detecting circuit 11 is connected to the extension telephone sets 110 via a connector 110'. The relay driving circuit 12 comprises two transistors 121 and 122 respectively driving two relays 123 and 124. The relays 123 and 124 have their common contacts connected together and are connected to the extension telephone set 110 via the connector 110'. The relay 123 has a normally open contact connected to the alternating current coupler 20 and a normally closed contact connected to none of other components in the circuit. The relay 124 has a normally closed contact connected to the telephone line 143 via a connector 143' and connected to the alternating current coupler 20. The relay 124 has a normally open contact connected to an output terminal 211 of the power supply 21. The power supply 21 has an input terminal 212 connected to a power supply 30. The power supply 21 has a triggering terminal connected to the output pin P3.1 of the microprocessor 10. The power supply 21 and the relay 124 of the relay driving circuit 12 are synchronously driven by the microprocessor 10 because the output pin P3.1 of the microprocessor 10 is connected to both the power supply 21 and the relay 124.

The pulse detecting circuit 14 comprises two comparators 141 and 142 and an input terminal 145 thereof is connected to the telephone line 143 via a bridge rectifier 140 and the connector 143'. The on-line holding circuit 15 comprises two transistors 151, 152 and a zener diode 153. The pulse outputting circuit 16 comprises three transistors 161, 162, and 163. The pulse outputting circuit 16 has an output terminal 164 connected to the telephone line 143 via the bridge rectifier 140 and the connector 143'. The line status detecting circuit 17 comprises a comparator 171 for comparing a voltage level on the telephone line 143 with a reference voltage thus detecting the change of the voltage level on the telephone line 143 and detecting whether or not other extension telephone sets 110 are being picked up. An output terminal of the line status detecting circuit 17 is connected to the input pin P1.7 of the microprocessor 10.

The on-line answering circuit 18 comprises a transistor 181 which has a collector connected to the telephone line 143 via the transistor 151 of the on-line holding circuit 15, the bridge rectifier 140, and the connector 143'. The buzzer triggering circuit 19 comprises a transistor 191 and a buzzer 192 connected to the transistor 191. The buzzer 192 is activated by the transistor 191 to emit a sound when the transistor 191 is activated by a pulse from the output pin P3.2 of the microprocessor 10.

While the present invention has been explained in relation to its preferred embodiment, it is to be understood that various modifications thereof will be apparent to those skilled in the art upon reading this specification. Therefore, it is to be understood that the invention disclosed herein is intended to cover all such modifications as fall within the scope of the appended claims.

I claim:

1. A communication controlling apparatus for a single-line telephone with extension telephone sets connected thereto, where the extension telephone sets are electrically connected by a telephone line and the communication controlling apparatus is connected to a corresponding extension telephone set, the communication controlling apparatus comprising:

a preprogrammed microprocessor;

a relay driving means being connected to the microprocessor and the extension telephone set; and connecting the telephone line with the extension telephone set;

an alternating current coupler being connected between the relay driving means and the telephone line for isolating a busy tone from the telephone line thus allowing the extension telephone set to have an intercom telephone communication with another extension telephone set without being disturbed by the busy tone;

an on-line detecting means being electrically connected between the microprocessor and the extension telephone set for detecting a status of the extension telephone set which is either picked up or hung up and sending a status indicative signal to inform the microprocessor of the status of the extension telephone set;

a pulse detecting means for detecting a call-in signal from any one of other extension telephone sets via the telephone line and sending a detecting signal to the microprocessor in response;

an on-line holding means for holding an external call-in signal on the telephone line;

a pulse outputting circuit being connected to and driven by the microprocessor to send a call-out signal to other extension telephone sets via the telephone line;

a power supply which is connected to and activated by the microprocessor for providing required working power to the relay driving circuit;

a setting switch being connected to the microprocessor for setting a number corresponding to this extension telephone set;

a key array being connected to the microprocessor for inputting either a transferring command or a dialing number of a destination extension telephone set to the microprocessor to command the microprocessor to execute a corresponding action;

whereby the extension telephone set is electrically connected to the telephone line via the relay driving means but not via the alternating current coupler when the extension telephone set is not picked up, but when the extension telephone set is picked up, the extension telephone set is electrically connected to the telephone line via the alternating current coupler and the relay driving means.

2. The communication controlling apparatus as claimed in claim 1 further comprising a line status detecting circuit for detecting whether or not a destination extension telephone set is being picked up when an external call-in signal is transferred from the extension telephone set to the destination extension telephone set, and to release the on-line holding means circuit when the destination extension telephone set is picked up.

3. The communication controlling apparatus as claimed in claim 2 further comprising an on-line answering circuit which is driven by the microprocessor to send out an answering ring via the telephone line to inform the received party that this extension telephone set is still on line when the external telephone call is being held.

4. The communication controlling apparatus as claimed in claim 1 further comprising a buzzer triggering means which is driven by the microprocessor to inform the user of this extension telephone set of a call from another extension telephone set.

* * * * *